US011929618B2

(12) United States Patent
Subramaniam et al.

(10) Patent No.: US 11,929,618 B2
(45) Date of Patent: Mar. 12, 2024

(54) SYSTEMS AND METHODS FOR ABRUPT VOLTAGE CHANGE DETECTION ON GRID AND REACTIVE CURRENT RESPONSE

(71) Applicant: Cummins Power Generation Limited, Ramsgate (GB)

(72) Inventors: Raghunandan Subramaniam, Kent (GB); Adunola Christiana Fashogbon, Kent (GB); Apoorv Prakash Hiremath, Kent (GB); Ankit Vinodchandra Patel, Kent (GB)

(73) Assignee: Cummins Power Generation Limited, Ramsgate (GB)

( * ) Notice: Subject to any disclaimer, the term of this patent is extended or adjusted under 35 U.S.C. 154(b) by 35 days.

(21) Appl. No.: 17/513,236

(22) Filed: Oct. 28, 2021

(65) Prior Publication Data
US 2022/0140605 A1 May 5, 2022

Related U.S. Application Data

(60) Provisional application No. 63/106,989, filed on Oct. 29, 2020.

(51) Int. Cl.
*H02J 3/18* (2006.01)
*G05B 19/042* (2006.01)
*H02J 13/00* (2006.01)

(52) U.S. Cl.
CPC ............. *H02J 3/18* (2013.01); *G05B 19/042* (2013.01); *H02J 13/00002* (2020.01); *G05B 2219/2639* (2013.01)

(58) Field of Classification Search
CPC .... H02J 3/18; H02J 13/00002; H02J 2300/10; H02J 3/16; H02J 3/38; H02J 3/001;
(Continued)

(56) References Cited

U.S. PATENT DOCUMENTS

| 2012/0175876 | A1* | 7/2012 | Pendray | .................. | F02D 29/06 |
| | | | | | 290/41 |
| 2015/0137520 | A1* | 5/2015 | Garcia | .................... | F03D 9/255 |
| | | | | | 290/44 |

(Continued)

FOREIGN PATENT DOCUMENTS

| CN | 110797886 A | * | 2/2020 | ................ H02J 3/24 |
| EP | 3 070 803 A | | 9/2016 | |

(Continued)

OTHER PUBLICATIONS

Foreign Search Report on EP 21205057.9 dated Mar. 30, 2022.

*Primary Examiner* — Charles Cai

(74) *Attorney, Agent, or Firm* — Foley & Lardner LLP

(57) ABSTRACT

Systems and methods for detecting abrupt voltage changes and supplying reactive power support are provided. In some embodiments, a genset connected to a power grid can identify a maximum voltage value and a minimum voltage value. The maximum voltage value and the minimum voltage value are based on an average of a plurality of mains voltage values. The genset may detect an abrupt voltage change by determining whether an instantaneous mains voltage value is above the maximum voltage value or below the minimum voltage value. The genset can adjust an amount of reactive current either supplied to the power grid or consumed by the genset for a period of time, responsive to detecting the abrupt voltage change.

20 Claims, 7 Drawing Sheets

(58) Field of Classification Search
CPC .......... H02J 3/12; H02J 3/381; G05B 19/042; G05B 2219/2639; Y02E 40/30; Y02E 40/70; Y04S 10/12
See application file for complete search history.

(56) References Cited

U.S. PATENT DOCUMENTS

2019/0093634 A1* 3/2019 Biris ................. H02J 3/1892
2021/0265841 A1* 8/2021 Brombach ............ H02J 3/48
2022/0077797 A1* 3/2022 Achilles ............. H02J 3/001

FOREIGN PATENT DOCUMENTS

| JP | 2006242739 A * | 9/2006 |
| WO | WO-2009/083448 A2 | 7/2009 |
| WO | WO-2013/185772 A2 | 12/2013 |
| WO | WO-2018/010028 A1 | 1/2018 |

* cited by examiner

SYSTEMS AND METHODS FOR ABRUPT VOLTAGE CHANGE DETECTION ON GRID AND REACTIVE CURRENT RESPONSE

CROSS-REFERENCE TO RELATED APPLICATIONS

This application claims the benefit of and priority to U.S. Patent Application No. 63/106,989, entitled "Systems and Methods for Abrupt Voltage Change Detection on Grid and Reactive Current Response", filed Oct. 29, 2020, the entirety of which is incorporated by reference herein.

TECHNICAL FIELD

The present disclosure relates generally to the field of electrical power generation. More particularly, the present disclosure relates to systems and methods for detecting an abrupt voltage change and providing reactive power support.

BACKGROUND

Generators can be connected to a power grid to supply power to various loads. The power output of a generator includes real power and reactive power. The ratio between real power and reactive power define a power factor. The power grid requires stable voltage in order to prevent damage to the various loads. In a situation where a voltage on the power grid drops below a set voltage, the generator can supply reactive power in order to support the voltage on the power grid. However, upon recovery of the voltage on the power grid, the generator may consume reactive power from the grid, which may cause further undesired fluctuations in voltage.

SUMMARY

One embodiment of the disclosure relates to a method of detecting abrupt voltage changes and supplying reactive power support. The method includes identifying, by a genset connected to a power grid, a maximum voltage value and a minimum voltage value based on an average of a plurality of mains voltage values. The method includes detecting, by the genset, an abrupt voltage change by determining whether an instantaneous mains voltage value is above the maximum voltage value or below the minimum voltage value. The method includes adjusting, by the genset, an amount of reactive current either supplied to the power grid or consumed by the genset for a period of time, responsive to detecting the abrupt voltage change.

In some embodiments, adjusting the amount of reactive current includes adjusting, by a controller of the genset, one or more gains of the controller at a reduced rate such that the genset regulates the amount of reactive current at a reduced rate of regulation. In some embodiments, adjusting the amount of reactive current comprises modifying, by the controller, the amount of reactive current back to a reference value after the period of time. In some embodiments, the reference value can be determined (e.g., by the controller) based on at least one of: a voltage of the genset, a power of the genset, or a current of the genset.

In some embodiments, adjusting the amount of reactive current includes determining, by a controller of the genset, whether the detected abrupt voltage change is a positive voltage change or a negative voltage change with respect to a power grid voltage. In some embodiments, adjusting the amount of reactive current comprises modifying, by the controller, a parameter of the genset by an offset that is large enough to provide reactive current adjustment for the period of time. In some embodiments, the reference value can be determined (e.g. by the controller) based on at least one of: a voltage of the genset, a power of the genset, or a current of the genset. In some embodiments, the parameter of the genset comprises a power factor value or a reactive power value. In some embodiments, adjusting the amount of reactive current includes removing, by the controller, the offset from the parameter of the genset after the period of time such that the parameter is modified back to a reference value.

In some embodiments, the genset may determine whether the abrupt voltage change occurs without one or more faults. In some embodiments, the one or more faults comprise a low voltage ride through (LVRT) or an over voltage ride through (OVRT). In some embodiments, the maximum voltage value comprises a value that is above an average instantaneous voltage by at least 5% (or other percent) of a set voltage. In some embodiments, the minimum voltage value comprises a value that is below an average instantaneous voltage by at least 5% (or other percent) of the set voltage. In some embodiments, the period of time comprises at least 5 (or other numbers) seconds.

In some embodiments, adjusting the amount of reactive current comprises selecting, by the controller, the offset responsive to determining that the detected abrupt voltage change is the negative voltage change, to operate the genset in an operating mode with a lagging power factor. In certain embodiments, the controller may adjust the amount of reactive current supplied to the power grid for the period of time, responsive to operating the genset in the operating mode with the lagging power factor. In some embodiments, adjusting the amount of reactive current comprises selecting, by the controller, the offset responsive to determining that the detected abrupt voltage change is the positive voltage change, to operate the genset in an operating mode with a leading power factor. In certain embodiments, the controller may adjust the amount of reactive current consumed by the genset for the period of time, responsive to operating the genset in the operating mode with the leading power factor.

Another embodiment relates to a control device for a genset connected to a power grid. The control device includes a processing circuit configured to identify a maximum voltage value and a minimum voltage value based on an average of a plurality of mains voltage values. The control device includes a processing circuit configured to detect an abrupt voltage change by determining whether an instantaneous mains voltage value is above the maximum voltage value or below the minimum voltage value. The control device includes a processing circuit configured to adjust an amount of reactive current either supplied to the power grid or consumed by the genset for a period of time, responsive to detecting the abrupt voltage change.

In some embodiments, the processing circuit may be configured to adjust the amount of reactive current by adjusting one or more gains of the control device at a reduced rate such that the genset regulates the amount of reactive current at a reduced rate of regulation. In certain embodiments, the processing circuit may be configured to adjust the amount of reactive current by modifying the amount of reactive current back to a reference value after the period of time. In some embodiments, the reference value can be determined (e.g., by the controller) based on at least one of: a voltage of the genset, a power of the genset, or a current of the genset.

In some embodiments, the processing circuit may be configured to adjust the amount of reactive current by determining whether the detected abrupt voltage change is a positive voltage change or a negative voltage change with respect to a power grid voltage. In some embodiments, the processing circuit may be configured to adjust the amount of reactive current by modifying a parameter of the genset by an offset that is large enough to provide reactive current adjustment for the period of time, wherein the parameter of the genset comprises a power factor value or a reactive power value. In certain embodiments, the processing circuit may be configured to adjust the amount of reactive current by removing the offset from the parameter after the period of time such that the parameter is modified back to a reference value. In some embodiments, the reference value can be determined (e.g., by the controller) based on at least one of: a voltage of the genset, a power of the genset, or a current of the genset.

In some embodiments, the processing circuit may be configured to select the offset responsive to determining that the detected abrupt voltage change is the negative voltage change, to operate the genset in an operating mode with a lagging power factor. The processing circuit may be configured to adjust the amount of reactive current supplied to the power grid for the period of time, responsive to operating the genset in the operating mode with the lagging power factor. In some embodiments, the processing circuit may be configured to select the offset responsive to determining that the detected abrupt voltage change is the positive voltage change, to operate the genset in an operating mode with a leading power factor. The processing circuit may be configured to adjust the amount of reactive current consumed by the genset for the period of time, responsive to operating the genset in the operating mode with the leading power factor. In certain embodiments, the maximum voltage value may comprise a value that is above an average instantaneous voltage by at least 5% of a set voltage and the minimum voltage value comprises a value that is below the average instantaneous voltage by at least 5% of the set voltage.

Another embodiment relates to a power generator system. The power generator system includes an alternator coupled to an engine configured to supply power to a power grid. The power generator system includes an automatic voltage regulator configured to supply reactive power support. The power generator system includes a controller configured to identify a maximum voltage value and a minimum voltage value based on an average of a plurality of mains voltage values. The power generator system includes a controller configured to detect an abrupt voltage change by determining whether an instantaneous mains voltage value is above the maximum voltage value or below the minimum voltage value. The power generator system includes a controller configured to adjust an amount of reactive current either supplied to the power grid or consumed by the power generator system for a period of time, responsive to detecting the abrupt voltage change.

In some embodiments, the controller can be configured to adjust the amount of reactive current by adjusting one or more gains of the controller at a reduced rate such that the power generator system regulates the amount of reactive current at a reduced rate of regulation. In some embodiments, the controller can be configured to adjust the amount of reactive current by modifying the amount of reactive current back to a reference value after the period of time. In some embodiments, the reference value can be determined (e.g., by the controller) based on at least one of: a voltage of the power generator system, a power of the power generator system, or a current of the power generator system.

In some embodiments, the controller can be configured to adjust the amount of reactive current by determining whether the detected abrupt voltage change is a positive voltage change or a negative voltage change with respect to a power grid voltage. In some embodiments, the controller can be configured to adjust the amount of reactive current by modifying a parameter of the power generator system by an offset that is large enough to provide reactive current adjustment for the period of time, wherein the parameter of the power generator system comprises a power factor value or a reactive power value. In some embodiments, the controller can be configured to adjust the amount of reactive current by removing the offset from the parameter after the period of time such that the parameter is modified back to a reference value. In some embodiments, the reference value can be determined (e.g., by the controller) based on at least one of: a voltage of the power generator system, a power of the power generator system, or a current of the power generator system.

In some embodiments, the controller may be configured to select the offset responsive to determining that the detected abrupt voltage change is the negative voltage change, to operate the power generator system in an operating mode with a lagging power factor. The controller can be configured to adjust the amount of reactive current supplied to the power grid for the period of time, responsive to operating the power generator system in the operating mode with the lagging power factor. In some embodiments, the controller may be configured to select the offset responsive to determining that the detected abrupt voltage change is the positive voltage change, to operate the power generator system in an operating mode with a leading power factor. The controller can be configured to adjust the amount of reactive current consumed by the power generator system for the period of time, responsive to operating the power generator system in the operating mode with the leading power factor. In certain embodiments, the maximum voltage value may comprise a value that is above an average instantaneous voltage by at least 5% of a set voltage and the minimum voltage value comprises a value that is below the average instantaneous voltage by at least 5% of the set voltage.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
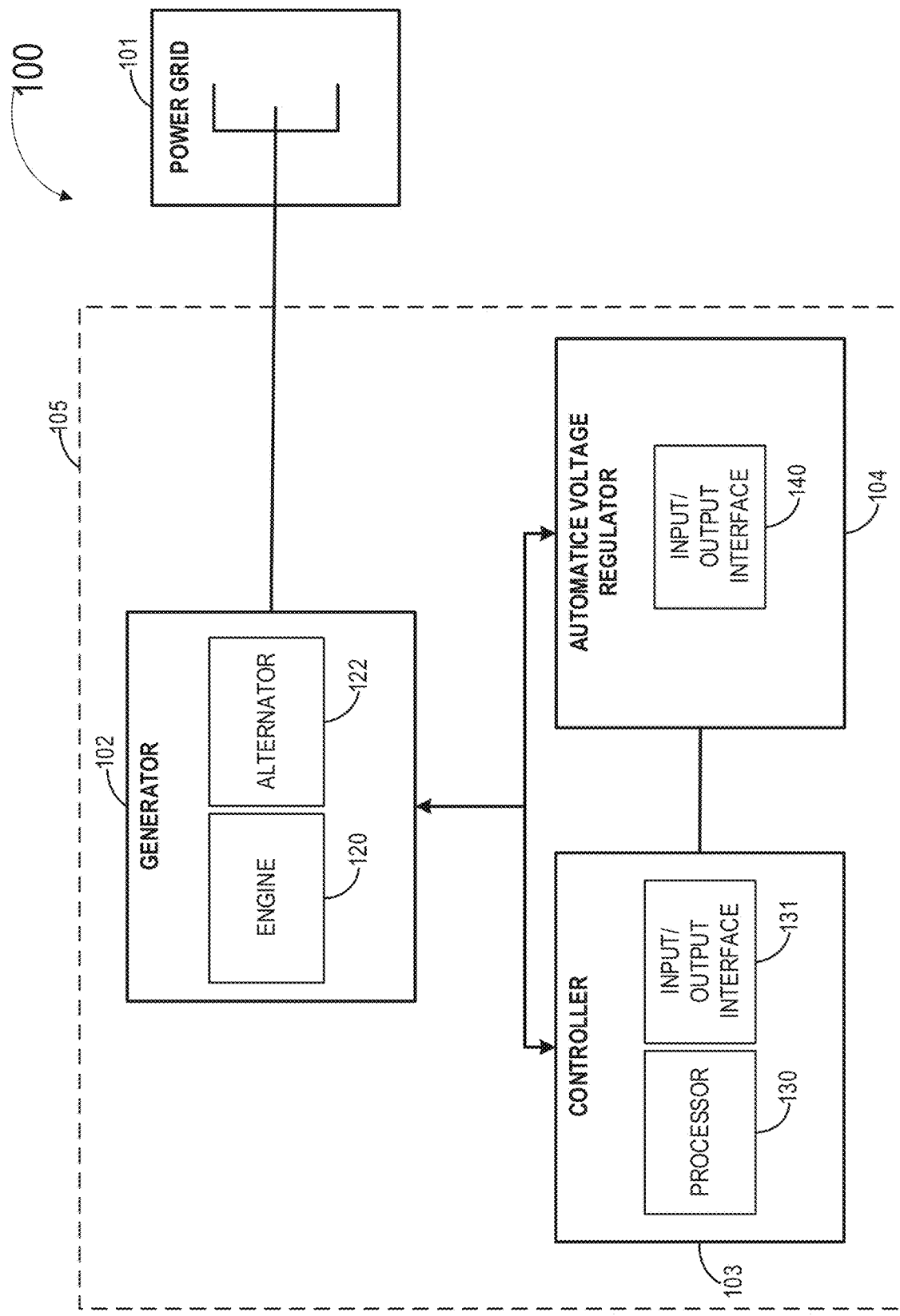
FIG. 1 is a block diagram illustrating a generator system according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods that may be used to power loads in conjunction with generators are provided according to exemplary embodiments. One or more generators (e.g., generator sets, or gensets) are used to provide power to one or more loads on a power grid. The power grid may have one or more generator sets (e.g., a plurality of generator sets, or one or more generator sets and one or more energy storage devices, connected in parallel) that support the power grid and thereby the loads of the power grid. The generator sets have controllers that maintain a power factor for each generator set. The power factor is the ratio of real power to reactive power output by the generator sets. In a stable operating condition, the controllers maximize the power factor in order to ensure that the generator sets are operating at maximum efficiency (e.g., that the generator sets are producing as much real power as possible and not wasting fuel or other resources by generating excess reactive power.)

However, the power demands of the generators connected to the power grid may vary with changing conditions, such as increasing and decreasing draw on the power grid or an abrupt voltage change during steady state operation of a generator system (e.g., genset). For example, a large draw on the grid (e.g., a factory starting large industrial equipment, generally a large inductive load) may cause the voltage on the power grid to drop suddenly. In this example, the power grid requires support from the generator sets connected to the power grid in order to recover/support the voltage quickly and thereby avoid any damage to electronics and other electrical equipment also connected to the power grid. In another example, a genset connected to the power grid may experience an abrupt voltage change with a magnitude that meets or exceeds one or more voltage values (e.g., an instantaneous mains voltage changes from 105% of a nominal voltage to 99%). The power grid requires reactive power support/recovery from the genset to regulate an amount of reactive current supplied to the power grid (or consumed by the genset). Reactive power exists in an AC circuit when the current and voltage are not in phase and defines the power factor of the system. Volt-ampere reactive (VAR) is a unit of measurement of reactive power. The power factor of an AC electrical power system is the ratio of the real power absorbed by the load to the apparent power flowing in the circuit. The generator sets support the power grid and keep the voltage steady by outputting reactive power. However, once the voltage has recovered, the generator sets may consume reactive power from power grid due to the generator sets controllers attempting to recover the generator set to the pre-fault power factor or grid voltage, which causes further variances in the voltage on the power grid. This is undesirable and in fact not in compliance with grid code compliance (GCC) in certain areas (e.g., Europe).

Certain technical specifications (e.g., German Grid Codes VDE 2018) may require the detection of abrupt voltage changes (e.g., changes of 4%, 5%, or other percent in the output voltage of a generator system). At least one genset may provide reactive power support for a certain period of time (e.g., 5 seconds or other amounts of time) responsive to detecting an abrupt voltage change. For example, the technical specifications may require the genset to identify abrupt voltage changes (e.g., identify a grid fault) during steady state operation. In response, the genset can provide reactive power support for at least 5 seconds (or other amounts of time) to stabilize the grid voltages. In addition to detecting abrupt voltage changes, the genset may be required to provide a steady state operation output voltage (e.g., a voltage that is within 10% of the bus voltages) and a fault ride-through (FRT) output response (e.g., a response to a change in voltage output, wherein the output voltage changes to a value that is less than 90% or more than 110% of the bus voltages). In some embodiments, the abrupt voltage change may cause the output voltage values of the genset to fall outside the established range for determining a FRT event (e.g., output voltage is more than 90% or less than 110% of the bus voltages). For example, the output voltage of the genset may change from 104% of a regulated grid voltage to 99%. Although the output voltage values are outside the range for determining a FRT event, the genset may determine the voltage change (e.g., 5% change) corresponds to an abrupt voltage change. Responsive to identifying the abrupt voltage change, the genset may provide reactive power support (e.g., for at least 5 seconds or other amounts of time) to the power grid.

The present disclosure provides exemplary systems and methods for adjusting the amount of reactive current in generator systems that need to comply with GCC. An exemplary method includes a genset connected to a power grid that can identify a maximum voltage value and a minimum voltage value. The maximum voltage value and the minimum voltage value are based on an average of a plurality of mains voltage values. The genset may detect an abrupt voltage change by determining whether an instantaneous mains voltage value is above the maximum voltage value or below the minimum voltage value. Responsive to detecting the abrupt voltage change, the genset may adjust an amount of reactive current either supplied to the power grid or consumed by the genset for a period of time. According to some embodiments, the systems and methods of the present disclosure may help address the issues of detecting abrupt voltage changes and preventing generator systems from consuming reactive power from the power grid after an abrupt voltage change.

Referring to FIG. 1, a block diagram illustrating a generator system 100 according to an exemplary embodiment is shown. In the illustrated embodiment, the generator system 100 includes a generator 102, a controller 103, and an automatic voltage regulator (AVR) 104. In some embodiments, the generators system 100 may include one or more generators 102. In some embodiments, a housing 105 of the generator system 100 can include the generator 102, the controller 103 and the AVR 104 (e.g., the same generator system 100 can include the generator 102, the controller 103, and the AVR 104). In some embodiments, the generator 102 can be separate and communicatively coupled to the controller 103 and the AVR 104, such that the controller 103 and the AVR 104 are separate from the generator system 100. The generator 102 may include an engine 120 coupled to an alternator 122. In some embodiments, the generator 102 may include one or more engines 120 and alternators 122. The engine 120 may be any type of machine configured to convert energy, such as fuel, into mechanical energy (e.g., motion). The engine 120 may be an internal combustion engine, such as a diesel engine.

The alternator 122 may be any type of machine configured to convert mechanical energy into electrical energy, such as an alternating current. In some embodiments, the alternator 122 includes a field winding, a rotor, and multiple poles. The field winding may be excited with a direct current (DC) in order to create a magnetic field and adjust the power factor. The rotor may be driven by the engine 120 and thereby create electric power. In some embodiments, generator 102 may include different and/or additional components than engine 120 and alternator 122 (e.g., a hydraulically powered generator driven using hydraulic fluid). The generator system 100 may be a mastered or masterless system (e.g., a masterless load demand genset system or a mastered paralleled genset system, with a centralized system controller coordinating the generators 102 of the system 100, or a distributed system 100 control contained in the generators 102 of the system 100, respectively).

An output of the generator 102 is connected to a power grid 101. The power grid 101 may be a local power grid (e.g., a power grid for a building, or multiple rooms) or a larger power grid 101 that supports one or more cities, towns, or villages. In some embodiments, the power grid 101 includes three phases. In this example, the generator 102 may include three outputs where each output is connected to one of the three phases. In alternative embodiments, the power grid 101 may include one or more phases, and the generator 102 may include any number of outputs connected to the one or more phases.

The automatic voltage regulator (AVR) 104 may include an input/output interface 140. The AVR 104 may also include various hardware components to implement the AVR 104 either with static electronics or dynamic moving parts. In some embodiments, the input/output interface 140 includes an electrical bus. The input/output interface 140 may include a first input terminal that is connected to the output of the generator 102 and that is configured to monitor the output characteristics of the generator 102. In one example, the AVR 104 may monitor the output voltage of the generator 102 in order to ensure that the voltage at the output is above a minimum voltage value and below a maximum voltage value. The maximum voltage value and the minimum voltage value are based on an average of a plurality of mains voltage values. The voltage at the output of the generator 102 may be maintained within a range (e.g., between the minimum and the maximum voltage value) to support the power grid 101. The voltage at the output of the generator 102 (and thereby on the power grid 101) will be affected by the loads on the power grid 101. For example, if a large industrial load is added to the power grid 101, the voltage of the power grid 101 (and thereby the voltage of the output of the generator 102) will dip until the power grid 101 receives enough power to drive the large industrial load (large inductive loads, such as large electric machinery or motors, can alter the power factor of the grid 101). The AVR 104 may control the engine or alternator in order to regulate the voltage on the output of the generator 102.

Additionally or alternatively, the first input may also monitor the phase of the voltage and current on the output of the generator 102 in order to detect a power factor (via the leading or lagging current and voltage phases) of the output of the generator 102. In other embodiments, one or more first input terminals may be used by the AVR 104 in order to monitor the voltage, power factor, power (e.g., reactive power), and current of the output of the generator 102. In some embodiments, the AVR 104 may include sensors to monitor the voltage, power factor, power, and current on the output of the generator 102. In some embodiments, the AVR 104 may receive via the one or more input terminals outputs from sensors that sense the voltage and current of the output of the generator 102. In some embodiments, the AVR 104 has a first priority to regulate the voltage on the output and a second priority to regulate the power factor of the generator 102. In some embodiments, the AVR 104 may monitor the line voltage between one or more outputs on the generator 102. The one or more outputs on the generator 102 may each be connected to phase of the power grid 101. In some embodiments the AVR 104 may monitor the phase voltage (e.g., the phase to neutral voltage) between the one or more outputs of the generator 102 that are each connected to a phase of the power grid 101.

The input/output interface 140 may include a second input terminal that is connected to the controller 103 that is configured to receive a signal that indicates a set power factor for the generator system 100. In this example, a signal (e.g., a DC signal) may indicate to the AVR 104 that the set power factor should be at a maximum (e.g., determined based on the particular generator 102). In one example, the maximum set power factor is 0.9 or larger. In another example, the signal may indicate to the AVR 104 that the set power factor should be at a minimum. The second input terminal of the input/output interface 140 can be configured to receive a signal (e.g., from the controller 103) that indicates at least one maximum voltage value and at least one minimum voltage value. For example, the signal may indicate to the AVR 104 that a mains voltage value should be below the maximum voltage value. In one example, the maximum voltage value is a value that is 5% (or other percent) above an average instantaneous voltage. In another example, the signal may indicate to the AVR 104 that the mains voltage value should be above the minimum voltage value. In one example, the minimum voltage value is a value that is 5% (or other percent) above the average instantaneous voltage. It is to be appreciated that these examples are only some potential implementations, in other embodiments, other signals may be input via the second input terminal that indicate to the AVR 104 the set power factor. In other embodiments, the AVR 104 may be integrated with the controller 103. In yet other embodiments, one or more second input terminals may be used by the AVR 104 in order to receive information regarding the set power factor and the set voltage from the controller 103.

The input/output interface 140 may include a first output terminal that may be connected to the generator 102 in order to control the power factor and current of the output of the generator 102. For example, in some embodiments, the first output terminal may be connected to a field winding of the alternator 122 in order to induce or control a direct current into the field winding in order to control the power factor of the output of the generator 102. In other embodiments, the AVR 104 may control the actual power factor of the output of the generator 102 via other facilitations or designs. In some embodiments, one or more first output terminals may be used by the AVR 104 in order to control the power factor and the voltage of the output of the generator 102. For example, the AVR 104 may utilize one or more first output terminals that are configured to signal to the generator 102 to spin faster, increase torque, or burn more fuel in order to regulate the voltage of the output of the generator 102 to the set voltage 104. In other embodiments, other methods of techniques may be used to regulate the voltage of the output of the generator 102 and regulate the power factor of the output of the generator 102.

The input/output interface 140 may include a second output terminal connected to the controller 103 and configured to provide the controller 103 with feedback regarding the output of the generator 102 (e.g., voltage, leading or lagging current, power factor, reactive current, etc.) or the state of the AVR 104 (e.g., set power factor.) In some embodiments, one or more second output terminals may be connected to the controller 103 in order to provide the controller 103 with feedback. In some embodiments, the input/output interface 140 may be wired via a physical electrical connection to the other components. In some embodiments, the input/output interface 140 may be wired via a physical electrical connection to some components (e.g., to the generator 102) and wirelessly connected to some components (e.g., to the controller, or the sensors monitoring the output of the generator 102). In some embodiments, the input/output interface 140 is connected to all of the other components wirelessly. That is, it is to be appreciated that terms such as "terminal" are not meant to be limited to a physical terminal configured to be connected physically to another device or "terminal" unless expressly recited.

The controller 103 may include a processor 130 and an input/output terminal 131. The processor 130 may include one or more processors 130 or one or more processors that include multiple processing cores. The controller 103 may also include a memory device that is configured to store machine-readable media. The machine readable media being readable by the processor 130 in order to execute the programs stored therein. The memory device may also include a database of set values, interpolation graphs (e.g., data), or other control or calculation parameters.

The input/output interface 131 may include one or more terminals configured to connect to the AVR 104 or the generator 102. For example, as discussed above, a first output terminal of the input/output interface 131 may be connected to the second input terminal of the AVR 104 in order to signal to the AVR 104 the set power factor or one or more voltage values (e.g., the maximum voltage value and the minimum voltage value). Additionally, as discussed above, the input/output interface 131 may include a first input terminal configured to connect to the second output terminal of the AVR 104 in order to receive feedback or other information from the AVR. The first input terminal and the first output terminal of the input/output interface 131 may be embodied as one or more physical contacts or as a combination of physical electrical contacts and wireless terminals.

In some embodiments, the input/output interface 131 may also include a second input terminal that may be connected to one or more sensors (not depicted) that measure the voltage, power factor, power, and current of the output of the generator 102. In some embodiments, the controller 103 receives the information regarding the voltage, power factor, power, and current of the output of the generator 102 directly from the sensors monitoring the output. In some embodiments, the controller 103 receives the information regarding the voltage, power factor, power, and current of the output of the generator 102 from the AVR 104. In some embodiments, the controller 103 may receive information regarding the voltage, power factor, power, and current of the output of the generator 102 from multiples sources (e.g., the AVR 104 and the sensors). The second input terminal may be embodied as one or more physical contacts or a combination of physical electrical contacts on a bus and wireless terminals. In some embodiments, the AVR 104 and the controller 103 may be integrated into one device and the communication may be more direct. Additionally or alternatively, the controller 103 may be connected to the generator 102 in a similar manner as the AVR 104 such that the controller 103 may perform the functions as described in reference to the AVR 104.

The controller 103 is configured to detect an abrupt voltage change within the generator system 100 (e.g., genset). An abrupt voltage change may refer to a deviation of the measured instantaneous voltage from the instantaneous pre-fault voltage by a certain percentage (e.g., 3%, 4%. 5%, or other percentages) of the nominal voltage within a period (e.g., 50 period). In response to detecting the abrupt voltage change, the controller 103 is configured to adjust an amount of reactive current (e.g., supplied to the power grid 101 or consumed by the genset) for a period of time. The controller 103 may adjust one or more gains (or other parameters) of the controller 103 at a reduced rate to adjust the amount of reactive current. In some embodiments, the controller 103 may modify one or more parameters (e.g., a power factor value or a reactive power value) of the genset by an offset, wherein the offset is large enough to adjust the amount of reactive current.

Figure 2:
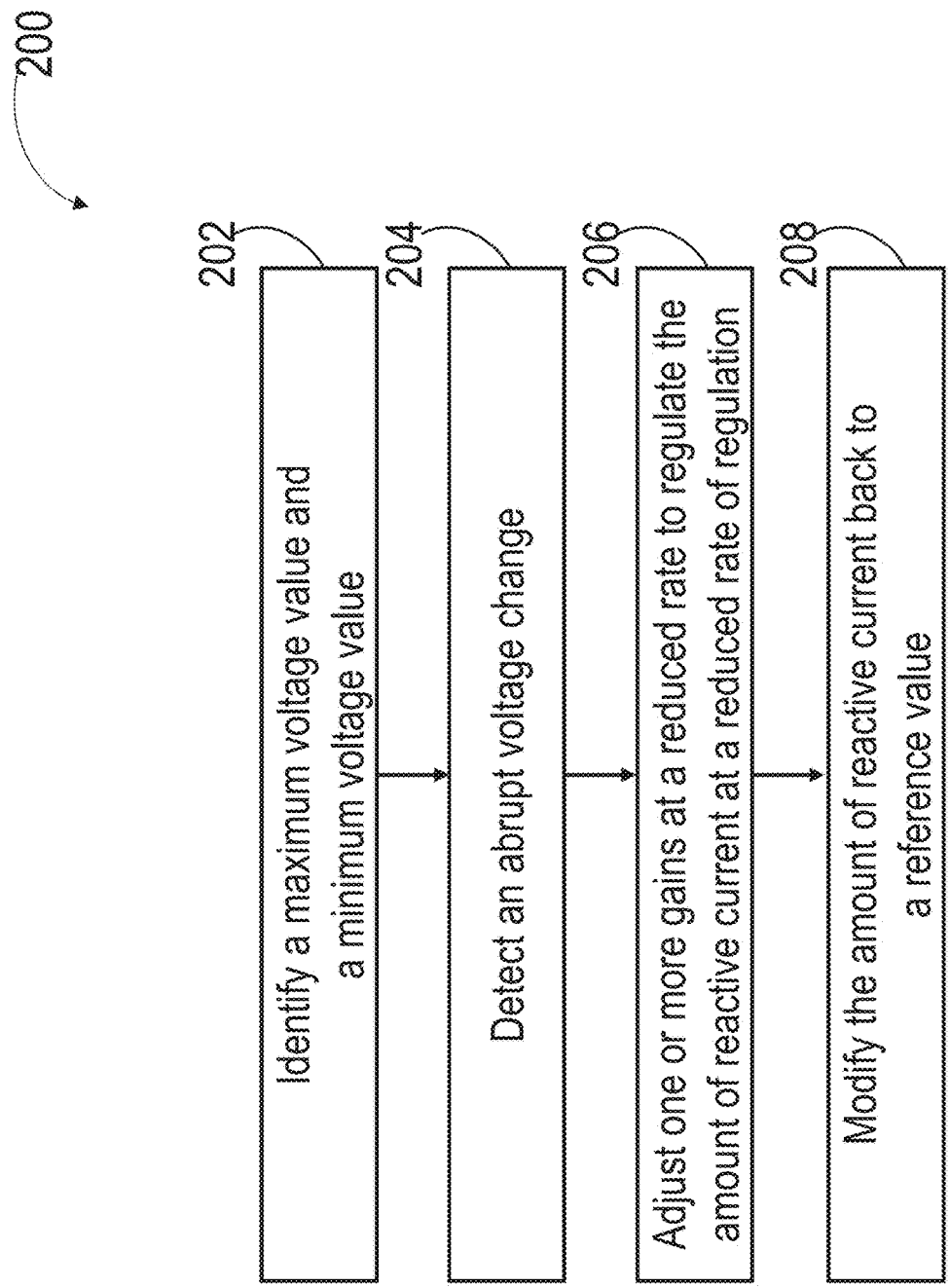
FIG. 2 is a flow diagram of a method for detecting abrupt voltage changes and supplying reactive power support according to an exemplary embodiment.

FIG. 2 illustrates a flow diagram of a method 200 for detecting abrupt voltage changes and supplying reactive power support according to an exemplary embodiment. The method 200 may be implemented using any of the components and devices detailed herein in conjunction with FIG. 1. In overview, the method 200 may include identifying a maximum voltage value and a minimum voltage value (202). The method 200 may include detecting an abrupt voltage change (204). The method 200 may include adjusting one or more gains of a controller at a reduced rate to regulate the amount of reactive current at a reduced rate of regulation (206). The method 200 may include modifying the amount of reactive current back to a reference value (208).

Referring now to operation 202, and in some embodiments, a genset connected to a power grid 101 can identify at least one maximum voltage value and at least one minimum voltage value. In operation 202, the controller 103 (or other components of the generator system 100) may identify the maximum and minimum voltage values. In some embodiments, the controller 103 can determine the maximum voltage value or the minimum voltage value. In some embodiments, the maximum voltage value comprises a value that is above an average instantaneous voltage by at least a threshold value, such as 5%, of a set voltage (e.g., a phase to phase mains nominal voltage). In some embodiments, the minimum voltage value comprises a value that is below an average instantaneous voltage by at least a threshold value, such as 5%, of the set voltage. To determine the maximum and minimum voltage values, the controller 103 may calculate a voltage value that corresponds to 5% (or other percentage values) of a mains nominal phase to phase voltage value (e.g., the set voltage). The maximum and minimum voltage values define the bounds of a pre-fault 5% (or other percentage values) tolerance band. While the minimum and maximum voltage values are defined in this example embodiment according to percentages of the average or instantaneous voltage value, it should be understood that, in other embodiments, the maximum and minimum voltage values could be defined as fixed values or in any other manner.

The maximum and minimum voltage values can be based on an average of a plurality of mains voltages. For example, the controller 103 can determine an average of a plurality of mains voltages by calculating a 1 second (or other amounts of time) moving average voltage value of a plurality of instantaneous root mean square (RMS) mains voltages. Once the controller 103 calculates the 5% voltage value of the set voltage and the moving average voltage value, the controller 103 may determine the maximum and minimum voltage values. For example, the controller 103 may combine (e.g., perform a summation or subtraction) the 5% voltage value and the moving average voltage value to determine the maximum and minimum voltage values. The controller 103 may determine the maximum voltage value by adding the 5% voltage value to the moving average voltage value. The controller 103 can calculate the minimum voltage value by subtracting the 5% voltage value from the moving average voltage value. In some embodiments, the controller 103 can send one or more determined maximum and minimum voltage values to the AVR 104 (e.g., via the input/output interface 131). The AVR 104 receives the one or more maximum and minimum voltage values via the input/output interface 140. Once the controller 103 identifies the maximum and minimum voltage values, the controller 103 or the AVR 104 can use the maximum and minimum voltage values to detect abrupt voltage changes. In some embodiments, the controller 103 or the AVR 104 may detect abrupt voltage changes by using the maximum voltage value or the minimum voltage value.

Referring now to operation 204, and in some embodiments, the genset can detect an abrupt voltage change. In operation 204, the AVR 104 or the controller 103 may detect abrupt voltage changes and faults. For example, the AVR 104 or the controller 103 may compare an instantaneous mains voltage value (e.g., instantaneous mains RMS voltage) to the minimum voltage value and the maximum voltage value. If the instantaneous mains voltage value is above the maximum voltage value or below the minimum voltage value, the AVR 104 or the controller 103 detects an abrupt voltage change. If the controller 103 or the AVR 104 detect an abrupt voltage change, the genset may adjust an amount of reactive current either supplied to the power grid 101 or consumed by the genset to support the reactive power response. In some embodiments, the controller 103 or the AVR 104 may be unable to detect another abrupt voltage change for a certain period of time (e.g., 60 seconds) after detecting an initial abrupt voltage change. One or more reactive power gains of the controller 103 may be adjusted at a reduced rate during the certain period of time.

The AVR 104 or the controller 103 may determine whether an abrupt voltage change occurs without one or more faults. In some embodiments, the fault is that the voltage on the output of the generator 102 is below 90% (or other percentage values) of the set voltage (e.g., a nominal phase to phase mains voltage). In some embodiments, the fault is that the voltage on the output of the generator 102 is above 110% (or other percentage values) of the set voltage. In other embodiments, the percentage of the set voltage that triggers the fault may be set within a range of 85%-98% (or other percentage values). The generator system 100 needs to react to the abrupt voltage change or fault in order to stay connected to the power grid 101 and in compliance with GCC. The capability of reacting to the fault and staying connected to the power grid 101 by the generator system 100 may be known as a fault ride through (FRT), an under voltage ride through (UVRT), or a low voltage ride through (LVRT).

Referring now to operation 206, and in some embodiments, a controller 103 of the genset can adjust one or more gains at a reduced rate such that the genset regulates the amount of reactive current at a reduced rate of regulation. Responsive to detecting the abrupt voltage change, the genset can adjust an amount of reactive current for a period of time (e.g., at least 5 seconds or other amounts of time). The amount of reactive current can correspond to an amount of reactive current supplied to the power grid 101 or consumed by the genset. If the genset detects an abrupt voltage change, the initial reaction of the genset will be to support the reactive power response by either consuming reactive power or supplying reactive power to the power grid 101. Responsive to the detection of the abrupt voltage change, the controller 103 may adjust one or more gains of the controller 103 at a reduced rate to modify the amount of reactive current either supplied or consumed by the genset. Responsive to adjusting the one or more gains of the controller 103 at a reduced rate, the genset may regulate the amount of reactive current (e.g., consumed or supplied by the genset) using a reduced rate of regulation (e.g., compared to a nominal rate of regulation). For example, the controller 103 may modify the proportional-integral-derivative (PID) gains of the controller 103 using a reduced rate of change (e.g., compared to a nominal rate of change) responsive to the detection of an abrupt voltage change. Therefore, the PID feedback control of the controller 103 may take more time (e.g., at least 5 seconds or other amounts of time) to return to a nominal value (e.g., a pre-fault value or pre-abrupt voltage change value). The controller 103 can adjust the PID gains over a period of time (e.g., at least 5 seconds) at a reduced rate of regulation, thereby ensuring the genset provides proper reactive power support (e.g., the genset supplies reactive current to the power grid 101 for up to 5 seconds).

In another example, one or more gains of the controller 103 may be adjusted at a reduced rate for a period of time responsive to detecting an abrupt voltage change. The reactive current may return to a pre-fault reactive current value over a longer period of time by adjusting the one or more gains at a reduced rate. During an abrupt voltage change or fault, the genset may consume or supply reactive power depending on whether the change in voltage is toward a maximum or minimum voltage band. The one or more gains may be modified using a slower rate to increase the time it takes for the reactive current to reach the pre-fault value. If the controller 103 adjusts the reactive current to provide reactive power support (e.g., supplying or consuming reactive current), the controller 103 may modify the amount of reactive current back to a reference value after the period of time (e.g., 5 seconds).

Referring now to operation 208, and in some embodiments, the controller 103 can modify the amount of reactive current back to a reference value after the period of time lapses. In some embodiments, the period of time may comprise at least 5 seconds (or other amounts of time). Therefore, if the controller 103 adjusts the amount of reactive current (e.g., regulates the amount of reactive current at a reduced rate) to support the reactive power response, the controller 103 may modify the reactive current back to a reference value (e.g., a nominal value or pre-fault value) after the initial adjustment. The controller 103 may modify the reactive current back to the reference value by allowing the one or more gains (e.g., PID gains) to return to a corresponding nominal value (e.g., a pre-fault value or pre-abrupt voltage change value). The controller 103 may receive information regarding the voltage, power (e.g., reactive power), and current (e.g., reactive current) of the output of the generator 102 from one or more sources (e.g., the AVR 104 and the sensors). The controller 103 may use the information to determine one or more reference values of the reactive current.

Figure 3:
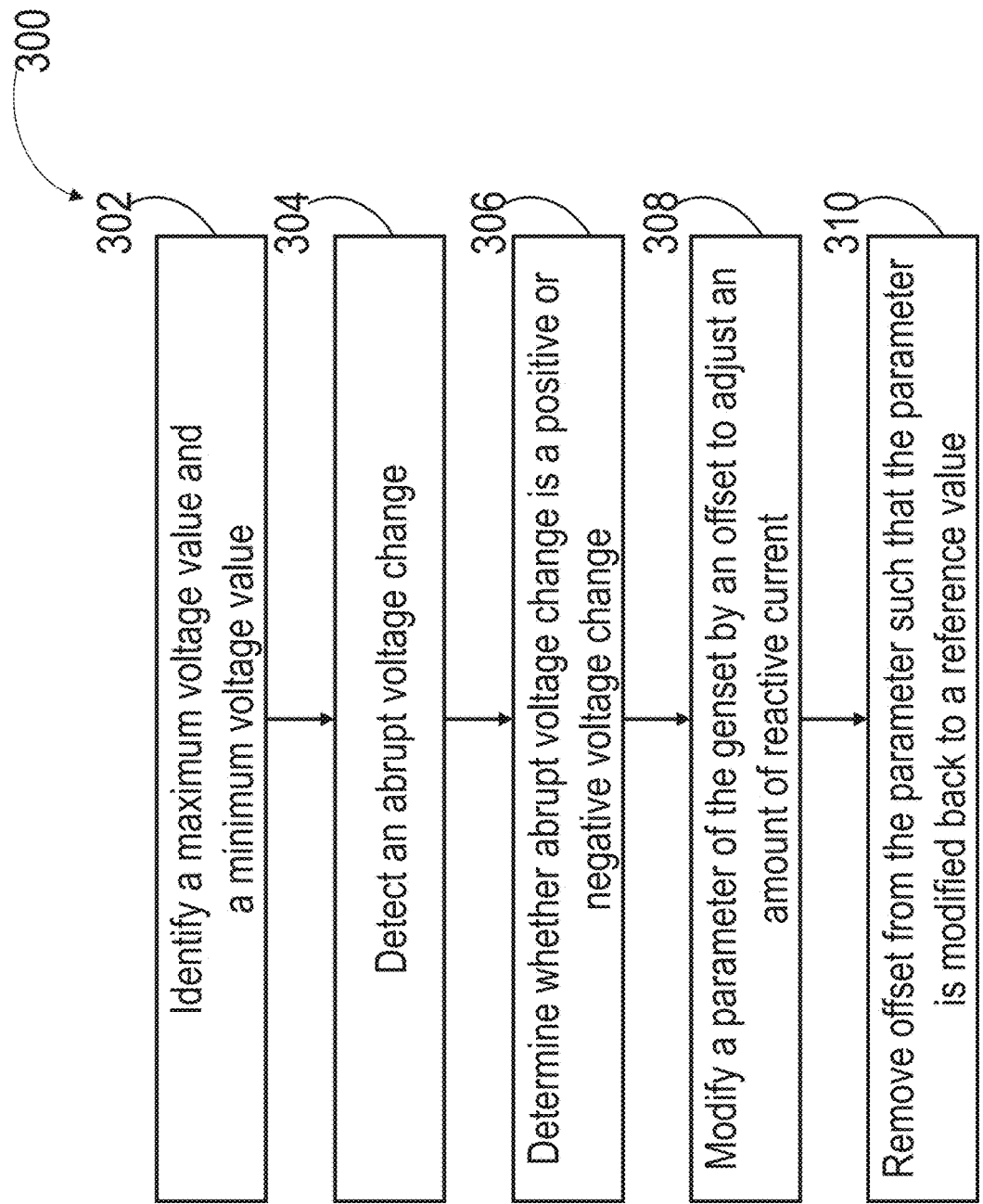
FIG. 3 is a flow diagram of a method for detecting abrupt voltage changes and supplying reactive power support according to an exemplary embodiment.

FIG. 3 illustrates a flow diagram of a method 300 for detecting abrupt voltage changes and supplying reactive power support, according to an exemplary embodiment. The method 300 may be implemented using any of the components and devices detailed herein in conjunction with FIG. 1. In overview, the method 300 may include identifying a maximum voltage value and a minimum voltage value (302). The method 300 may include detecting an abrupt voltage change (304). The method 300 may include determining whether the detected abrupt voltage change is a positive or negative voltage change (306). The method 300 may include modifying a parameter of the genset by an offset to adjust an amount of reactive current (308). The method 300 may include removing the offset from the parameter such that the parameter is modified back to a reference value (310).

Referring now to operation 302, and in some embodiments, a genset connected to a power grid 101 can identify at least one maximum voltage value and at least one minimum voltage value. The operations and functionalities of operation 302 may comprise any one or more of the components, operations, and characteristics described in connection with operation 202 of the method 200. Referring now to operation 304, and in some embodiments, the genset can detect an abrupt voltage change. The operations and functionalities of operation 304 may comprise any one or more of the components, operations, and characteristics described in connection with operation 204 of the method 200.

Referring now to operation 306, and in some embodiments, a controller 103 of the genset can determine whether the detected abrupt voltage change is a positive or negative voltage change. The detected abrupt voltage change can correspond to a positive or negative voltage change with respect to a power grid 101 voltage. For example, a genset may operate at a grid voltage that is 105% (or other percentage values) of the nominal voltage of the genset. The operating voltage of the genset may drop to 99% (or other percentage values) of the nominal voltage value of the genset. The controller 103 or the AVR 104 may determine that the voltage drop corresponds to an abrupt voltage change. The controller 103 or the AVR 104 may receive the voltage values via the sensors or the corresponding input/output interface. In addition to detecting the abrupt voltage change, the controller 103 may identify the direction of the change in voltage (e.g., a change in the negative direction or a change in the positive direction). In our previous example, the controller 103 may determine the detected abrupt voltage change is a negative voltage change (e.g., from 105% to 99%). In another example, the controller 103 may determine a detected abrupt voltage change is a positive voltage change (e.g., from 99% to 105%). Responsive to determining whether the abrupt voltage change is a positive or negative voltage change, the controller 103 may select an offset to provide reactive power support.

Referring now to operation 308, and in some embodiments, the controller 103 can modify a parameter of the genset by an offset for a period of time. In some embodiments, the offset can be large enough to provide reactive current adjustment (e.g., reactive power support) for the period of time (e.g., 5 seconds or other amounts of time). In some embodiments, the parameter can comprise a power factor value, a reactive power value or other values that are related to the genset. The controller 103 can select the offset using information associated to the detected abrupt voltage change (e.g., whether the abrupt voltage change corresponds to a positive or negative voltage change). Using the previous example, the controller 103 may determine that a detected abrupt voltage change is a negative voltage change (e.g., from 105% of the nominal voltage of the genset to 99%). Responsive to identifying the negative voltage change, the controller 103 may select a reactive power offset (or power factor offset) to operate the genset in lagging power factor mode. The controller 103 may use the selected offset to modify the reactive power (or power factor) of the genset. Therefore, the genset is forced to adjust the reactive current of the output of the generator 102, providing (or exporting) reactive power to the power grid 101 for at least the period of time (e.g., 5 seconds or other amounts of time). By providing reactive power to the power grid 101, the genset regulates the grid voltage to pre-fault (or pre-abrupt voltage change) conditions.

In another example, the controller 103 may determine that a detected abrupt voltage change is a positive voltage change (e.g., from 99% of the nominal voltage of the genset to 105%). Responsive to identifying the positive voltage change, the controller 103 may select a power factor offset (or reactive power offset) to operate the genset in leading power factor mode. The controller 103 may use the selected offset to modify the power factor (or reactive power) of the genset. Therefore, the genset is forced to adjust the reactive current of the output of the generator 102, consuming (or importing) reactive power from the power grid 101 for at least the period of time (e.g., 5 seconds or other amounts of time). By consuming reactive power from the power grid 101, the genset regulates the grid voltage to pre-fault (or pre-abrupt voltage change) conditions. In some embodiments, operation 308 may comprise using an artificial positive or negative voltage set point for the PID feedback control loop of the controller 103 of the genset (e.g., with full sized gain levels). Using the artificial voltage set point may cause the genset to regulate the power grid 101 voltages and provide (or consume) the required reactive kVARs to the power grid 101 following an abrupt voltage change.

Referring now to operation 310, and in some embodiments, the controller 103 can remove the offset from the parameter such that the parameter is modified back to a reference value. Responsive to adjusting the reactive current, the controller 103 can remove the selected offset from the parameter (e.g., a reactive power value or a power factor value) after the period of time (e.g., at least 5 seconds or other amounts of time) lapses. Removing the offset from the parameter may cause the parameter to return to a reference value (e.g., a nominal or pre-fault value). Therefore, removing the offset from the parameter may cause the genset to return to pre-fault (or pre-abrupt voltage) operating conditions. The controller 103 may receive information regarding the voltage, power (e.g., reactive power), and current (e.g., reactive current) of the output of the generator 102 from one or more sources (e.g., the AVR 104 and the sensors). The controller 103 may use the information to determine one or more reference values of the parameter. The new value of the bus voltage (e.g., after removing the offset from the parameter) may correspond to an updated reference voltage value with which to evaluate whether an abrupt voltage change occurs.

Figure 4:
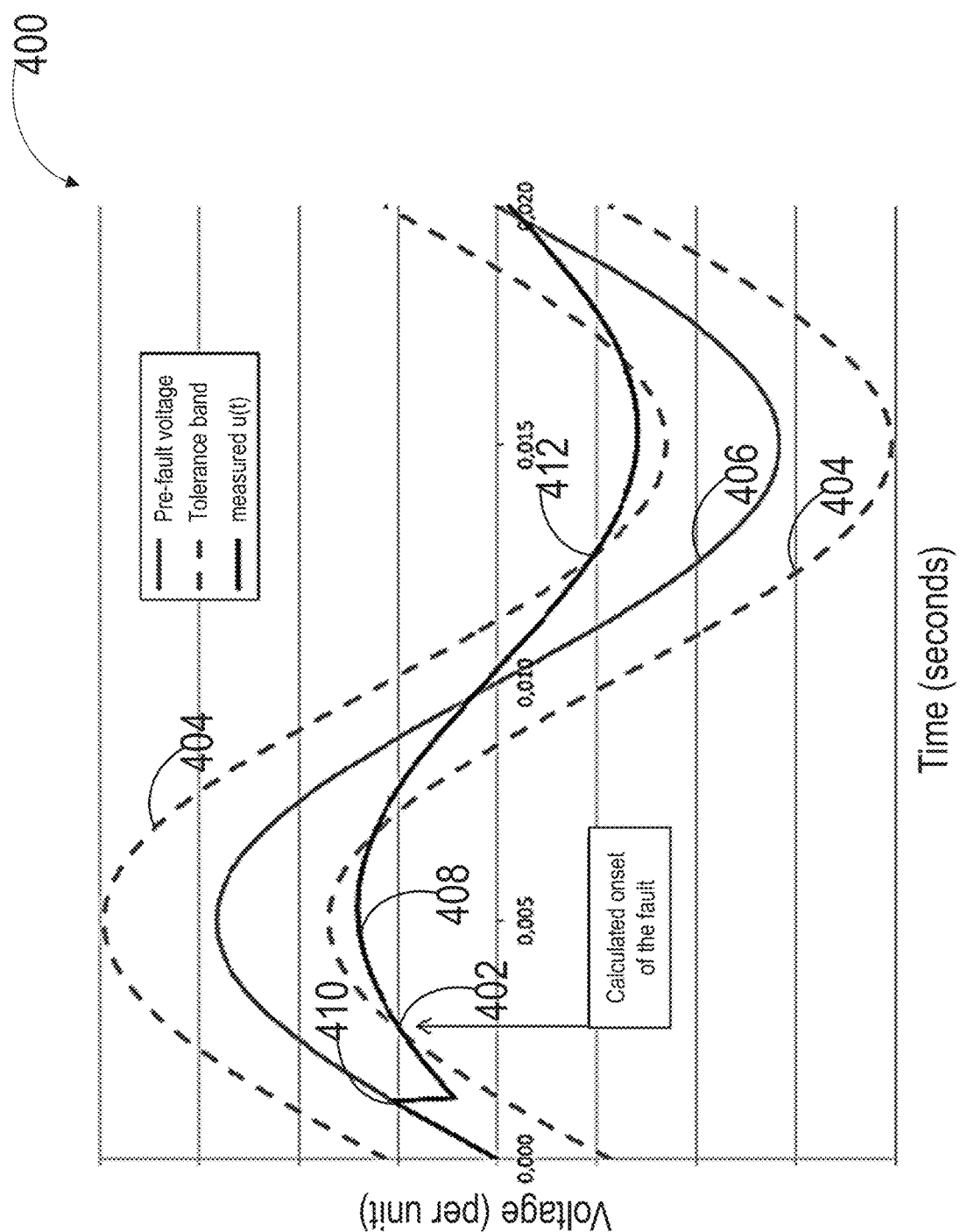
FIG. 4 is a graph illustrating an abrupt voltage change according to an exemplary embodiment.

FIG. 4 illustrates a graph 400 representing an abrupt voltage change, according to an exemplary embodiment. The graph 400 includes a y-axis indicating values for the voltages (in units of per unit) and an x-axis indicating time (in units of seconds). The graph includes the time profile (e.g., time profile of the last 50 periods) of four different charts, each indicating a tolerance band 404, a pre-fault voltage 406, and a measured voltage u(t) 408. The tolerance band 404 indicates the maximum voltage value and the minimum voltage value at a point in time. The characteristics and functionalities of the maximum voltage value and the minimum voltage value may include any one or more of the functionalities, operations, and characteristics described in connection with the maximum voltage value and the minimum voltage value of operation 202 of method 200. The tolerance band 404 is shown on both sides (e.g., below and above) of the pre-fault voltage 406. The curve of the tolerance band 404 that is above the pre-fault voltage 406 specifies the maximum voltage value at a point in time. The curve of the tolerance band 404 that is below the pre-fault voltage 408 indicates the minimum voltage value at a point in time. The magnitude of the tolerance band 404 (e.g., distance between the pre-fault voltage 408 and the tolerance band 404) may be magnified (or minimized) for illustration purposes, and therefore, may be unequal to the magnitude of the tolerance band in certain embodiments.

The pre-fault voltage 406 illustrates the output voltage of a generator 102 of a genset in the absence of an abrupt voltage change or a fault (e.g., a LVRT or OVRT event). In the absence of an abrupt voltage change (or fault), the pre-fault voltage 406 falls within the tolerance band 404 for the duration of the time profile of the graph. The measured voltage 408 illustrates the measured output voltage of the generator 102 responsive to one or more abrupt voltage changes or faults. The measured voltage 408 has a first point 410 that may correspond to the initial occurrence of an abrupt voltage change (or fault). Responsive to the abrupt voltage change, the measured voltage 408 may intersect or cross the tolerance band 404 (e.g., from within the range defined by the tolerance band 404 to outside the range). The intersection (or crossing) of the measured voltage 408 (e.g., with the tolerance band 404) may indicate a detected abrupt voltage change. For example, the controller 103 of the genset may detect an abrupt voltage change when the measured voltage 408 intersects or crosses the tolerance band 404. Points 402 and 412 of the measured voltage 408 may specify an intersection or crossing between the measured voltage 408 and the tolerance band 404. The first intersecting point 402 can indicate the calculated onset of the abrupt voltage change (or fault). A change of the measured voltage 408 that exceeds the tolerance band 404 can indicate the arithmetic onset of the abrupt voltage change or fault.

Figure 5:
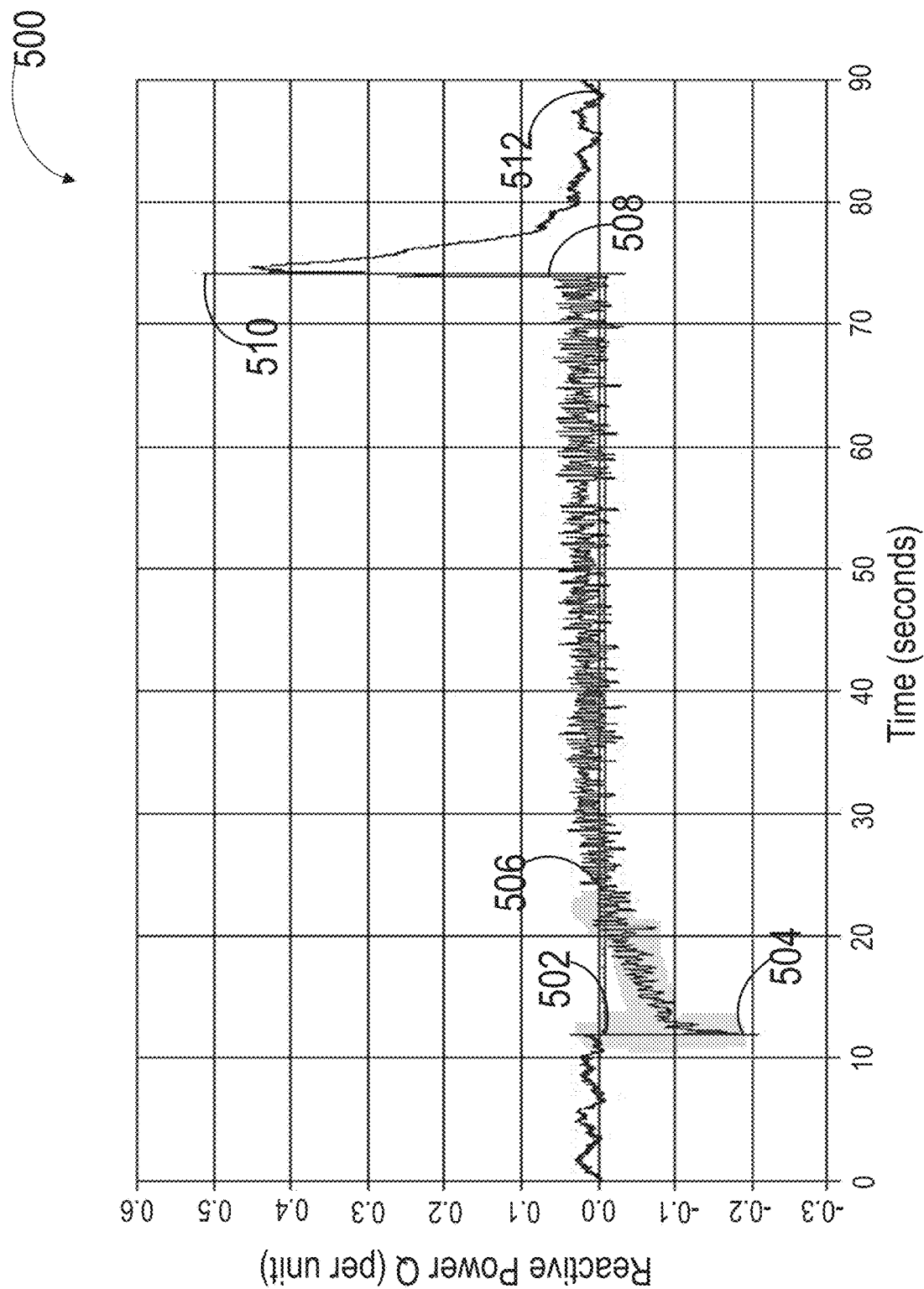
FIG. 5 depicts results of a generator system during an abrupt voltage change according to an exemplary embodiment.

FIG. 5 illustrates a graph 500 of the reactive power of a genset during an abrupt voltage change, according to an exemplary embodiment. The graph 500 includes a y-axis indicating the reactive power input/output of the generator 102 to the power grid 101 (in units of per unit) and an x-axis indicating time (in units of seconds). The graph illustrates the measured reactive power of an example genset during an OVRT event. The measured reactive power graph has a point 502 that corresponds to the onset of the OVRT event. Responsive to the OVRT event, the measured reactive power of the genset may change from a nominal value (e.g., 0 kVARs, point 502) to a negative reactive power value (point 504). Therefore, the genset may provide reactive power support by consuming reactive power from the grid 101 (e.g., responsive to the OVRT event). In an embodiment of method 200, the controller 103 of a genset can detect the abrupt voltage change (e.g., the OVRT event denoted in the graph between points 502 and 504). Responsive to detecting the OVRT event, the controller 103 may adjust the amount of reactive current of the genset (e.g., denoted in the graph between points 504 and 506) by modifying one or more gains of the controller 103 (e.g., at a reduced rate). Therefore, the controller 103 may cause the reactive current of the genset to reach the nominal value at a slower rate (e.g., point 506). For example, the controller 103 may cause the genset to consume reactive current from the grid 101 for a period of time (e.g., denoted in the graph between points 504 and 506) by adjusting the gains of the controller 103 at a reduced rate. Therefore, the controller 103 causes the genset to support the reactive power response. The graph illustrates the aforementioned dynamic between points 504 (e.g., initial response of the genset to the OVRT event) and 506 (e.g., genset reaches the nominal value of reactive power at least 5 seconds after the initial response).

In some embodiments, the measured reactive power of a genset can change in response to a LVRT event. The graph illustrating the measured reactive power of the genset has a point 508 that may correspond to the onset of a LVRT event. Responsive to the LVRT event, the measured reactive power of the genset may change from a nominal value (e.g., 0 kVARs, point 508) to a positive reactive power value (point 510). The genset can support the reactive power response by supplying reactive power to the grid 101 (e.g., responsive to the LVRT event). In an embodiment of method 200, the controller 103 of a genset can detect the abrupt voltage change (e.g., the LVRT event denoted in the graph between points 508 and 510). Responsive to detecting the LVRT event, the controller 103 may adjust the amount of reactive current of the genset (e.g., denoted in the graph between points 510 and 512) by modifying one or more gains of the controller 103 (e.g., at a reduced rate). Therefore, the controller 103 may cause the reactive current of the genset to reach the nominal value at a slower rate (e.g., point 512). For example, the controller 103 may cause the genset to supply reactive current to the grid 101 for a period of time (e.g., denoted in the graph between points 510 and 512) by adjusting the gains of the controller 103 at a reduced rate.

Figure 6:
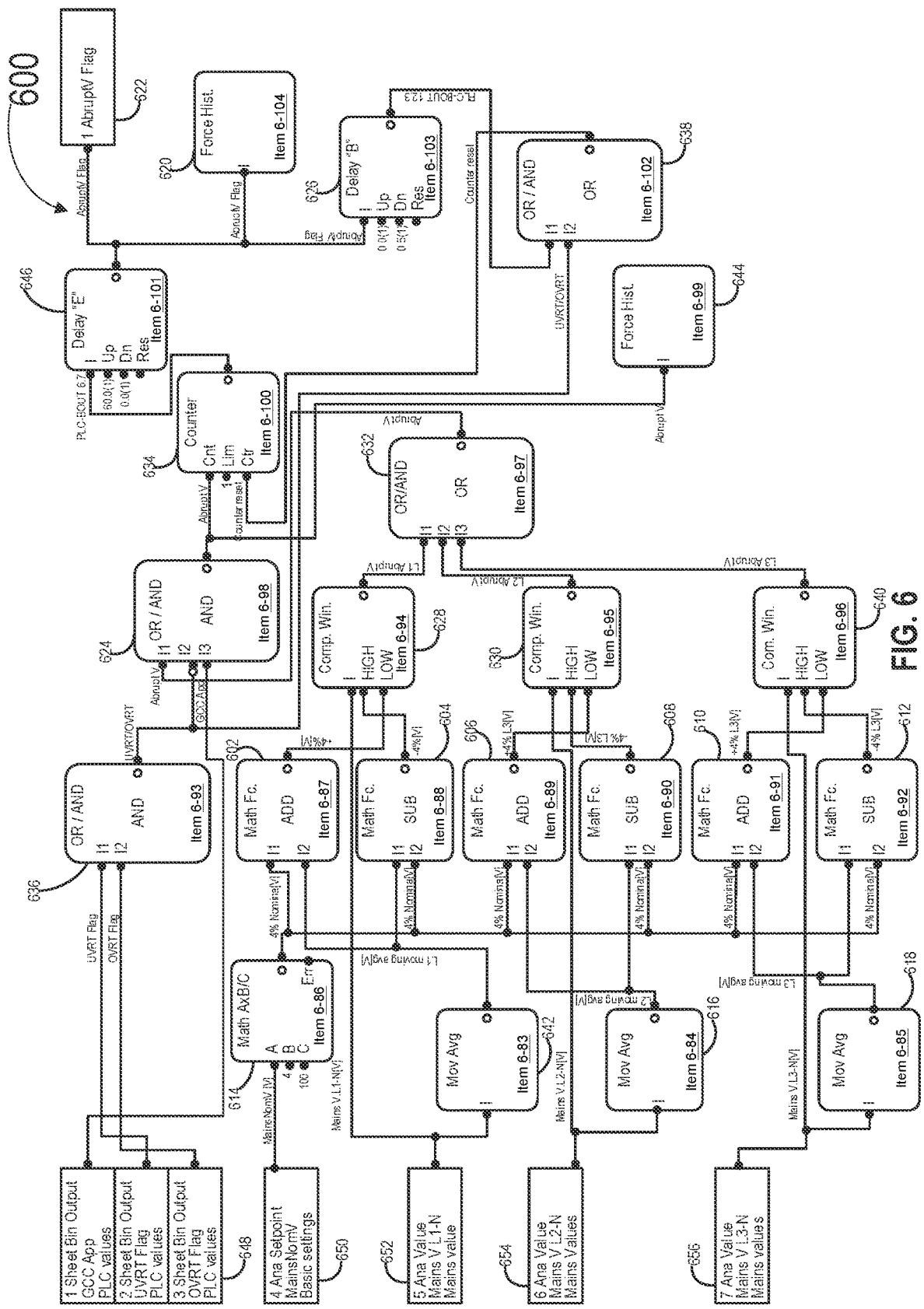
FIG. 6 is a logic diagram of a process for detecting abrupt voltage changes according to an exemplary embodiment.

FIG. 6 illustrates a logic diagram of a process 600 for detecting abrupt voltage changes, according to an exemplary embodiment. One or more parts of FIG. 1 may be referenced for purposes of demonstration while discussing FIG. 6. The logic of FIG. 6 can detect an abrupt voltage change and provide an output (e.g., logical binary output) indicating that the abrupt voltage change has been detected. In some embodiments, the controller 103 (or other components of the generator system 100) or a separate device can implement the logic illustrated in FIG. 6.

In some embodiments, element 614 of the logic diagram can calculate a voltage value that corresponds to 4% (or other percentage values) of a set voltage (e.g., a phase to phase mains nominal voltage). Element 614 may determine the voltage value (e.g., 4% of the set voltage) using one or more operations other than the one shown in FIG. 6. The value corresponding to the 4% of the set voltage value can be used to determine at least one maximum voltage value and at least one minimum voltage value. Elements 616, 618, and 642 of the logic diagram may calculate an average of a plurality of mains voltages by calculating a moving average (e.g., 1 second moving average) of a plurality of instantaneous RMS mains voltages (or other voltages). Elements 616, 618, and 642 may determine the average values using other averaging approaches other than a moving average. The averages of the plurality of mains voltages can be used to determine the maximum voltage values and the minimum voltage values. For example, elements 602, 606, and 610 may use the 4% of the set voltage and the average values (e.g., calculated by elements 616, 618, and 642) to determine one or more maximum voltage values. Elements 602, 606, and 610 may determine the maximum voltage values by adding (or performing other operations) the 4% of the set voltage and the corresponding average value. In some embodiments, elements 604, 608, and 612 can use the 4% of the set voltage and the average values (e.g., calculated by elements 616, 618, and 642) to determine one or more minimum voltage values. Elements 604, 608, and 612 may determine the minimum voltage values by subtracting (or performing other operations) the 4% of the set voltage from the corresponding average value. The maximum voltage values and the minimum voltage values can be used to detect an abrupt voltage change.

In some embodiments, elements 628, 630, and 640 of the logic diagram can compare the maximum and minimum voltage values to one or more instantaneous RMS mains voltages (or other voltages). For example, elements 628, 630, and 640 may determine whether the instantaneous RMS mains voltages are within the bounds of a voltage range defined by the maximum voltage values (e.g., calculated by elements 602, 606, and 610) and the minimum voltage values (e.g., calculated by elements 604, 608, and 612). If the instantaneous voltages exceed the range (e.g., greater than the maximum voltage values or less than the minimum voltage values), the output of elements 628, 630, and 640 can correspond to a value of 1 (e.g., an abrupt voltage change is detected). The range may correspond to a pre-fault tolerance band. In some embodiments, element 624 may detect whether an abrupt voltage change occurs without one or more faults (e.g., LVRT or UVRT). Although an abrupt voltage change can occur with at least one fault, detecting an abrupt voltage change during other dynamic faults is not required to be in compliance with certain GCCs. One or more elements of the logic diagram (e.g., elements 634, 646, or other elements) can cause the controller 103 to change the gains of the controller 103 at a reduced rate (e.g., for at least 60 seconds or other amounts of time). While the controller 103 changes the gains, the logic shown in FIG. 6 is unable to detect the occurrence of another abrupt voltage change.

Figure 7:
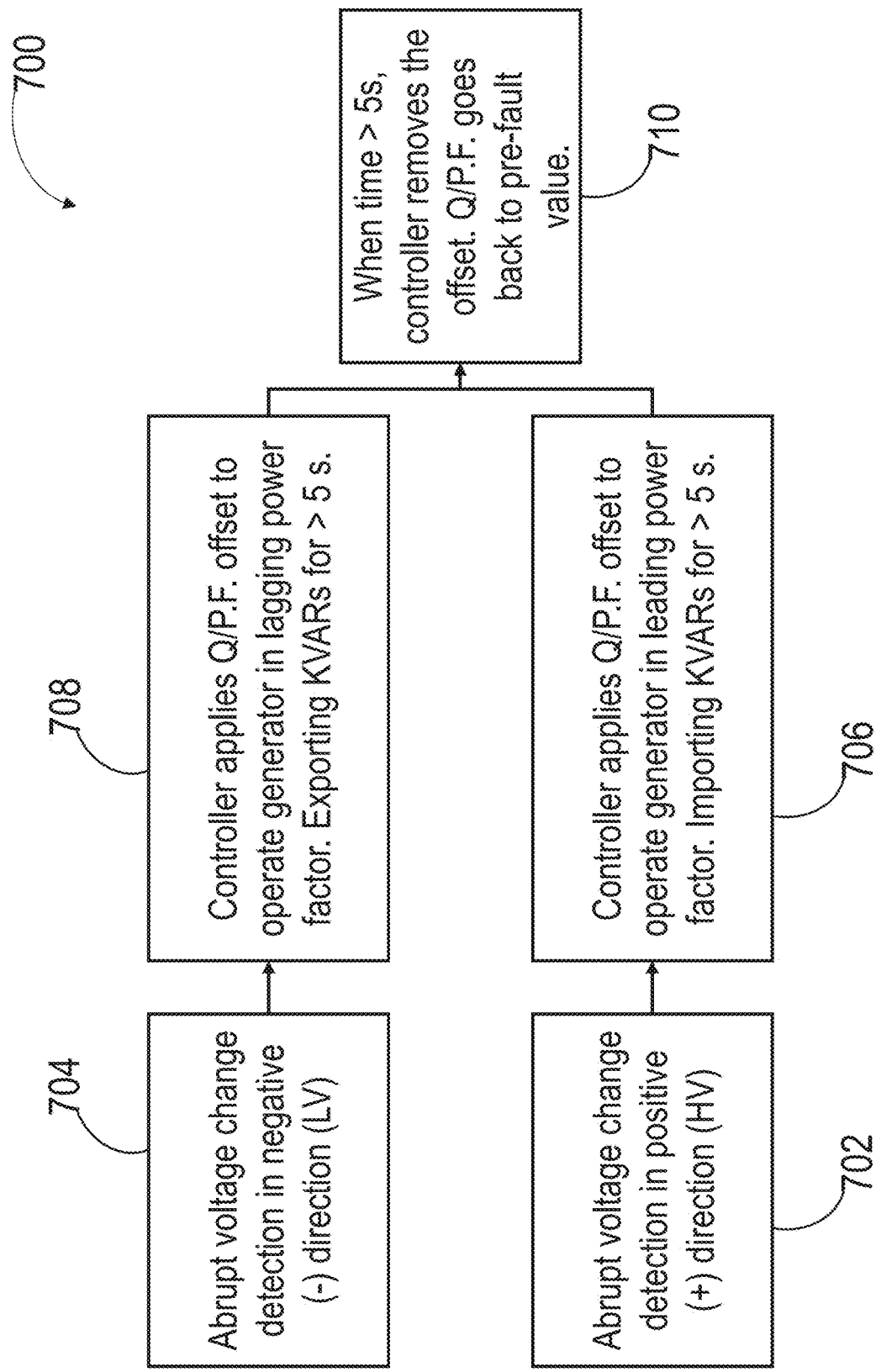
FIG. 7 is a flow diagram of a method for detecting abrupt voltage changes and supplying reactive power support according to an exemplary embodiment

FIG. 7 illustrates a flow diagram of a method 700 for detecting abrupt voltage changes and supplying reactive power support, according to an exemplary embodiment. Various parts of FIG. 1 may be referenced for purposes of demonstration while discussing FIG. 7. In operation 704, a controller 103 of a genset may detect an abrupt voltage change in a negative direction (e.g., compared to the grid voltage). For example, a voltage of a genset operating at 106% of a nominal voltage may change to 100% of the nominal voltage. The controller 103 may determine the voltage change corresponds to an abrupt voltage change in the negative direction (e.g., a 6% change in the negative direction from 106% to 100%). In some embodiments, an abrupt voltage change in the negative direction may be referred to as a low abrupt voltage change (LV). In operation 702, the controller 103 of the genset may detect an abrupt voltage change in a positive direction (e.g., compared to the grid voltage). For example, a voltage of a genset operating at 98% of a nominal voltage may increase to 105% of the nominal voltage. The controller 103 may determine the voltage change corresponds to an abrupt voltage change in the positive direction (e.g., a 7% change in the positive direction from 98% to 105%). In some embodiments, an abrupt voltage change in the positive direction may be referred to as a high abrupt voltage change (HV). The operations and functionalities of operations 702 and 704 may comprise any one or more of the components, operations, and characteristics described in connection with operations 302, 304 and 306 of method 300.

In operation 708, the controller 103 may apply a reactive power offset (Q offset) or a power factor offset (P.F. offset) to operate the genset in lagging power factor. In operation 706, the controller 103 may apply a Q offset or a P.F. offset to operate the genset in leading power factor. The controller 103 may use the detected direction of change of the abrupt voltage change (e.g., a LV or a HV) to determine whether to apply an offset that causes the genset to operate in lagging or leading power factor. If the genset operates in lagging power factor, the genset can supply reactive power (e.g., export kVARs) to the grid 101 for a period of time (e.g., at least 5 seconds or other amounts of time). If the genset operates in leading power factor, the genset can consume reactive power (e.g., import kVARs) from the grid 101 for the period of time. The controller 103 can apply the Q offset (or the P.F. offset) to the reactive power value (or power factor value) of the genset for the period of time. Responsive to applying the Q offset (or the P.F. offset), the controller 103 can cause the genset to adjust the reactive current of the output of the generator 102 (e.g., supporting the reactive power response). By adjusting the reactive current, the genset can cause the grid voltage to return to a pre-fault (or pre-abrupt voltage change) value. The operations and functionalities of operations 706 and 708 may comprise any one or more of the components, operations, and characteristics described in connection with operation 308 of method 300.

In operation 710, the controller 103 removes the offset (e.g., Q offset or P.F. offset) when the period of time (e.g., at least 5 seconds) lapses. Responsive to removing the offset from the reactive power value (or the power factor value), the controller 103 may cause the reactive power of the genset or (the power factor of the genset) to return to a pre-fault (or pre-abrupt voltage change) value or a nominal value. The operations and functionalities of operation 710 may comprise any one or more of the components, operations, and characteristics described in connection with operation 310 of method 300.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of detecting abrupt voltage changes and supplying reactive power support comprising:
   identifying, by a genset connected to a power grid, a maximum voltage value and a minimum voltage value based on an average of a plurality of mains voltage values;
   detecting, by the genset, an abrupt voltage change by determining whether an instantaneous mains voltage value is above the maximum voltage value or below the minimum voltage value;
   determining, by the genset, an operating mode associated with a power factor and a reactive power of the genset based on the detected abrupt voltage change; and
   adjusting, by the genset, based on the operating mode, an amount of reactive current either supplied to the power grid or consumed by the genset for a period of time.

2. The method of claim 1, wherein adjusting the amount of reactive current comprises:
   adjusting, by a controller of the genset, one or more gains of the controller at a reduced rate such that the genset regulates the amount of reactive current at a reduced rate of regulation; and
   modifying, by the controller, the amount of reactive current back to a reference value after the period of time,
   wherein the reference value is determined based on at least one of: a voltage of the genset, a power of the genset, or a current of the genset.

3. The method of claim 1, wherein adjusting the amount of reactive current comprises:
   determining, by a controller of the genset, whether the detected abrupt voltage change is a positive voltage change or a negative voltage change with respect to a power grid voltage;
   modifying, by the controller, a parameter of the genset by an offset to provide reactive current adjustment for the period of time, wherein the parameter of the genset comprises a power factor value or a reactive power value; and removing, by the controller, the offset from the parameter after the period of time such that the parameter is modified back to a reference value,
wherein the reference value is determined based on at least one of: a voltage of the genset, a power of the genset, or a current of the genset.

4. The method of claim 3, further comprising:
selecting, by the controller, the offset responsive to determining that the detected abrupt voltage change is the negative voltage change, to operate the genset in the operating mode with a lagging power factor; and
adjusting, by the controller, the amount of reactive current supplied to the power grid for the period of time, responsive to operating the genset in the operating mode with the lagging power factor.

5. The method of claim 3, further comprising:
selecting, by the controller, the offset responsive to determining that the detected abrupt voltage change is the positive voltage change, to operate the genset in the operating mode with a leading power factor; and
adjusting, by the controller, the amount of reactive current consumed by the genset for the period of time, responsive to operating the genset in the operating mode with the leading power factor.

6. The method of claim 1, further comprising:
determining, by the genset, whether the abrupt voltage change occurs without one or more faults, wherein the one or more faults comprise a low voltage ride through (LVRT) or an over voltage ride through (OVRT).

7. The method of claim 1, wherein the maximum voltage value comprises a value that is above an average instantaneous voltage by at least 5% of a set voltage and the minimum voltage value comprises a value that is below the average instantaneous voltage by at least 5% of the set voltage.

8. The method of claim 1, wherein the period of time comprises at least 5 seconds.

9. A control device for a genset connected to a power grid comprising:
a processing circuit configured to:
identify a maximum voltage value and a minimum voltage value based on an average of a plurality of mains voltage values;
detect an abrupt voltage change by determining whether an instantaneous mains voltage value is above the maximum voltage value or below the minimum voltage value;
determine an operating mode associated with a power factor and a reactive power of the genset based on the detected abrupt voltage change; and
adjust, based on the operating mode, an amount of reactive current either supplied to the power grid or consumed by the genset for a period of time.

10. The control device of claim 9, wherein the processing circuit is configured to adjust the amount of reactive current by:
adjusting one or more gains of the control device at a reduced rate such that the genset regulates the amount of reactive current at a reduced rate of regulation; and
modifying the amount of reactive current back to a reference value after the period of time,
wherein the reference value is determined based on at least one of: a voltage of the genset, a power of the genset, or a current of the genset.

11. The control device of claim 9, wherein the processing circuit is configured to adjust the amount of reactive current by:

determining whether the detected abrupt voltage change is a positive voltage change or a negative voltage change with respect to a power grid voltage;
modifying a parameter of the genset by an offset to provide reactive current adjustment for the period of time, wherein the parameter of the genset comprises a power factor value or a reactive power value; and
removing the offset from the parameter after the period of time such that the parameter is modified back to a reference value,
wherein the reference value is determined based on at least one of: a voltage of the genset, a power of the genset, or a current of the genset.

12. The control device of claim 11, wherein the processing circuit is configured to:
select the offset responsive to determining that the detected abrupt voltage change is the negative voltage change, to operate the genset in the operating mode with a lagging power factor; and
adjust the amount of reactive current supplied to the power grid for the period of time, responsive to operating the genset in the operating mode with the lagging power factor.

13. The control device of claim 11, wherein the processing circuit is configured to:
select the offset responsive to determining that the detected abrupt voltage change is the positive voltage change, to operate the genset in the operating mode with a leading power factor; and
adjust the amount of reactive current consumed by the genset for the period of time, responsive to operating the genset in the operating mode with the leading power factor.

14. The control device of claim 9, wherein the maximum voltage value comprises a value that is above an average instantaneous voltage by at least 5% of a set voltage and the minimum voltage value comprises a value that is below the average instantaneous voltage by at least 5% of the set voltage.

15. A power generator system comprising:
an alternator coupled to an engine configured to supply power to a power grid,
an automatic voltage regulator configured to supply reactive power support, and
a controller configured to:
identify a maximum voltage value and a minimum voltage value based on an average of a plurality of mains voltage values;
detect an abrupt voltage change by determining whether an instantaneous mains voltage value is above the maximum voltage value or below the minimum voltage value;
determine an operating mode associated with a power factor and a reactive power of the genset based on the detected abrupt voltage change; and
adjust, based on the operating mode, an amount of reactive current either supplied to the power grid or consumed by the power generator system for a period of time.

16. The power generator system of claim 15, wherein the controller is configured to adjust the amount of reactive current by:
adjusting one or more gains of the controller at a reduced rate such that the power generator system regulates the amount of reactive current at a reduced rate of regulation; and modifying the amount of reactive current back to a reference value after the period of time,
wherein the reference value is determined based on at least one of: a voltage of the power generator system, a power of the power generator system, or a current of the power generator system.

17. The power generator system of claim 15, wherein the controller is configured to adjust the amount of reactive current by:
   determining whether the detected abrupt voltage change is a positive voltage change or a negative voltage change with respect to a power grid voltage;
   modifying a parameter of the power generator system by an offset to provide reactive current adjustment for the period of time, wherein the parameter of the power generator system comprises a power factor value or a reactive power value; and
   removing the offset from the parameter after the period of time such that the parameter is modified back to a reference value,
   wherein the reference value is determined based on at least one of: a voltage of the power generator system, a power of the power generator system, or a current of the power generator system.

18. The power generator system of claim 17, wherein the controller is configured to:
   select the offset responsive to determining that the detected abrupt voltage change is the negative voltage change, to operate the power generator system in the operating mode with a lagging power factor; and
   adjust the amount of reactive current supplied to the power grid for the period of time, responsive to operating the power generator system in the operating mode with the lagging power factor.

19. The power generator system of claim 17, wherein the controller is configured to:
   select the offset responsive to determining that the detected abrupt voltage change is the positive voltage change, to operate the power generator system in the operating mode with a leading power factor; and
   adjust the amount of reactive current consumed by the power generator system for the period of time, responsive to operating the power generator system in the operating mode with the leading power factor.

20. The power generator system of claim 15, wherein the maximum voltage value comprises a value that is above an average instantaneous voltage by at least 5% of a set voltage and the minimum voltage value comprises a value that is below the average instantaneous voltage by at least 5% of the set voltage.

\* \* \* \* \*